UNITED STATES PATENT OFFICE.

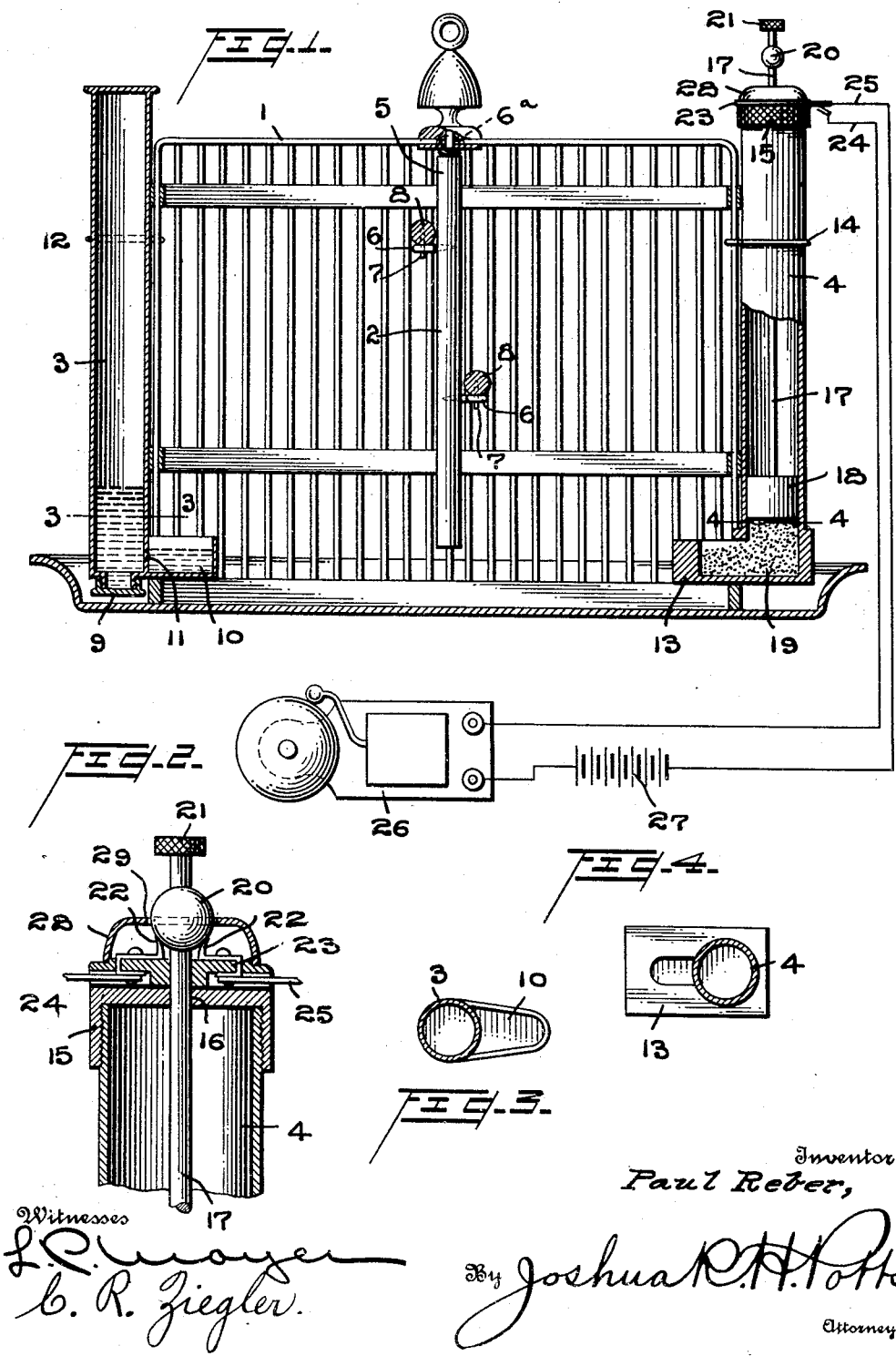

PAUL REBER, OF PHILADELPHIA, PENNSYLVANIA.

BIRD-CAGE.

1,224,415.  Specification of Letters Patent.  Patented May 1, 1917.

Application filed April 8, 1915. Serial No. 19,866.

*To all whom it may concern:*

Be it known that I, PAUL REBER, a subject of the Emperor of Germany, residing at Philadelphia, in the county of Philadelphia and State of Pennsylvania, have invented certain new and useful Improvements in Bird-Cages, of which the following is a specification.

My invention relates to improvements in bird cages, and more particularly to improved mechanism for feeding the birds, the object of the invention being to provide an alarm electrically controlled to notify the caretaker when the seed compartment is empty or nearly empty as desired.

A further object is to provide an improved construction of seed receptacle having a weight therein resting upon the seed and movable downwardly as the seed is consumed, and provide in connection with said weight, an improved circuit closing device, whereby an electric circuit is closed to sound an alarm when the weight reaches a predetermined position in the receptacle.

With these and other objects in view, the invention consists in certain novel features of construction and combinations and arrangements of parts as will be more fully hereinafter described and pointed out in the claims.

In the accompanying drawings:

Figure 1 is a view in longitudinal section partly in elevation and partly diagrammatic illustrating my improvements.

Fig. 2 is an enlarged view in vertical section through the upper end of the seed receptacle.

Fig. 3 is a view in transverse section through the water tank taken on the line 3—3 of Fig. 1, and Fig. 4 is a similar view of the seed receptacle taken on the line 4—4 of Fig. 1.

1 represents a bird cage having a swinging roost 2 at the center, a water tank 3 at one end, and a seed receptacle 4 at its other end. The swinging roost 2 is made up of vertical bars 5 having hooks 6ª at their upper ends engaging the top of the cage so as to permit the bars to swing. These bars 5 have eyes 6, receiving pins 7 on horizontal roosts 8, so that the parts can be readily assembled or separated as desired.

The water tank 3 constitutes an elongated vertically positioned receptacle closed at its upper end, and having a removable plug 9 at its lower end.

10 is trough connected by an openning 11 with the lower portion of the receptacle, and this trough is maintained with a predetermined level of water as long as there is any water in the tank.

To fill the tank, plug 9 is removed while the tank is inverted, and afterward replaced; the tank being properly positioned, the pressure on the trough 10 will maintain a uniform level as is well understood.

A wire clamp 12 holds the receptacle 3 in proper position against the end of the bird cage 1, while the trough 10 is projected inside of the cage. The seed receptacle 4 also constitutes an elongated vertically positioned receptacle having a trough 13 at its lower end projecting into the cage and in open communication with the receptacle 4.

A wire clamp 14 similar to clamp 12 is utilized to removably connect receptacle 4 with the end of the cage. A cap 15 is screwed onto the upper end of receptacle 4, and is provided with a central opening 16 through which a rod 17 is projected. The lower end of this rod 17 is secured to a weight 18, which rests directly upon the seed 19, and moves downwardly as the seed is consumed.

On the upper portion of the rod 17, a metal ball 20 is secured, and a finger hold 21 is secured to the rod above the ball. Two electric contacts 22 normally apart, and located at opposite sides of the rod 17, are secured to a disk 23 of insulating material, and these contacts are connected by wires 24 and 25 with an electric alarm 26 and a battery 27 respectively.

In other words, the contacts are in electric circuit with a bell or other alarm, which circuit includes any form of battery or source of electricity.

The electric contacts 22 are made of two pieces of strip material which have their upper end portions diverging as shown in Fig. 2, and it is between these two diverging end portions that the ball 20 moves as the weight 18 descends. The space between the upwardly extending diverging portions of said contacts is smaller than the diameter of the ball, hence the ball engages and rests between said diverging portions, the weight of the ball and the weight 18 acting to form a positive contact with said diverging portions.

On top of the cap 15, I secure a cover 28 which prevents tampering with the contacts 22, and this cover is provided with an opening 29 large enough for the ball to pass therethrough to engage the contacts.

When the seed in the receptacle is low, or nearly exhausted, the rod 17 is in such a position that the ball 20 engages the contacts 22, closing the electric circuit and sounding the alarm, and I would have it understood that this alarm may be located at any place desired to best notify the attendant.

As the receptacles 3 and 4 are of approximately the same size, the replenishing of seed and water will be necessary at substantially the same time, and hence whenever the alarm rings, the attendant will know that the cage needs both seed and water.

When it is desired to fill the seed receptacle, cap 15 is unscrewed and removed, and it is of course to be understood that the cap carries with it the rod 17 and weight 18, so that the receptacle is open for the admission of seed.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a device of the character described, the combination of a tubular receptacle, a cap fitting the upper end of the receptacle, an insulating disk on said cap, a pair of members secured to said disk, said members being made of strip material and having upwardly diverging end portions forming electric contacts on the top of the receptacle, a rod extending through the cap into the receptacle, a weight on the lower end of the rod slidable within the receptacle and resting upon the contents thereof, said weight being movable downwardly as the contents are dispensed, a member fixed to the rod and adapted to move between and engage both of said diverging portions when the weight reaches a pre-determined position in the receptacle, a cover on said disk and inclosing said contacts, said cover having a hole therein through which said latter member and rod pass, substantially as described.

2. In a dispensing receptacle, a pair of members made of strip material and having upwardly diverging end portions forming contacts on the top of the receptacle, a rod extending through the top of the receptacle and located between the contacts, a weight on the lower end of the rod slidable within the casing and resting upon the contents in the receptacle, said weight being movable downwardly as the contents are dispensed, a ball fixed to the rod and adapted to engage between both of said diverging portions when the weight reaches a pre-determined position in the receptacle, a cover secured on the upper end of the receptacle inclosing said contacts and having an opening in its center for the passage of the ball, a finger-hold on the end of the rod above the ball and positioned above the upper end of the receptacle, said finger-hold being designed to be grasped to elevate the rod and weight when the ball is in its contact-engaging position, substantially as described.

In testimony whereof I have signed my name to this specification in the presence of two subscribing witnesses.

PAUL REBER.

Witnesses:
MARIE JACKSON,
CHAS. C. POTTS.